United States Patent
Mazina

(10) Patent No.: US 8,370,571 B2
(45) Date of Patent: Feb. 5, 2013

(54) TRANSFER CONTROL OF A STORAGE VOLUME BETWEEN STORAGE CONTROLLERS IN A CLUSTER

(75) Inventor: Daniel J. Mazina, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 566 days.

(21) Appl. No.: 12/420,405

(22) Filed: Apr. 8, 2009

(65) Prior Publication Data
US 2010/0262772 A1      Oct. 14, 2010

(51) Int. Cl.
*G06F 13/00*      (2006.01)
(52) U.S. Cl. ........................ 711/114; 711/100
(58) Field of Classification Search ............... 711/114, 711/100, 165; 707/781; 712/220; 709/221, 709/224
See application file for complete search history.

(56) References Cited

U.S. PATENT DOCUMENTS

| | | | |
|---|---|---|---|
| 6,138,125 A | 10/2000 | DeMoss | |
| 6,430,714 B1 | 8/2002 | McAdam | |
| 6,671,259 B1* | 12/2003 | He et al. | 370/238 |
| 6,886,074 B1 | 4/2005 | Narayanaswamy | |
| 2003/0070041 A1 | 4/2003 | Beardsley | |
| 2008/0162987 A1 | 7/2008 | El-Batal | |
| 2010/0106990 A1* | 4/2010 | Kalman | 713/323 |

OTHER PUBLICATIONS

Detect Hard Drive Failure Before It Happens by Jim Aspinwall, Ecoustics.com, Jul. 8, 2005, (6 pages).
A Fault-Tolerant Architecture for Supporting Large Scale Digital Libraries, Science and Technology Librarianship by Giacomo et al., Summer 2003 (8 pages).
Hard Disk Failure,Wikipedia, Mar. 4, 2009 (2 pages).
Sun StorEdge NAS Clustered Failover, Sun Microsystems, Jun. 2005 (12 pages).
Intransa StorStac Architectural Overview, Feb. 11, 2007 (5 pages).
Veritas Volume Manager Administrator's Guide, Solaris, 5.0 Maintenance Pack 3, Symantec (679 pages), published on 2008.

* cited by examiner

*Primary Examiner* — VanThu Nguyen
*Assistant Examiner* — Khamdan Alrobaie

(57) ABSTRACT

A first storage controller that is part of a cluster of storage controllers includes an interface to communicate with at least one storage subsystem having a storage volume, where the first storage controller is initially assigned to process requests for the storage volume. The first storage controller further includes a processor to receive requests to access the storage volume, where the requests include client requests from one or more client computers and proxy requests from one or more other storage controllers in the cluster. Based on monitoring the client requests and the proxy requests, it is determined that a second of the storage controllers in the cluster is to be assigned to process requests for the storage volume. In response to the determining, control of the storage volume is transferred from the first storage controller to the second storage controller.

21 Claims, 3 Drawing Sheets

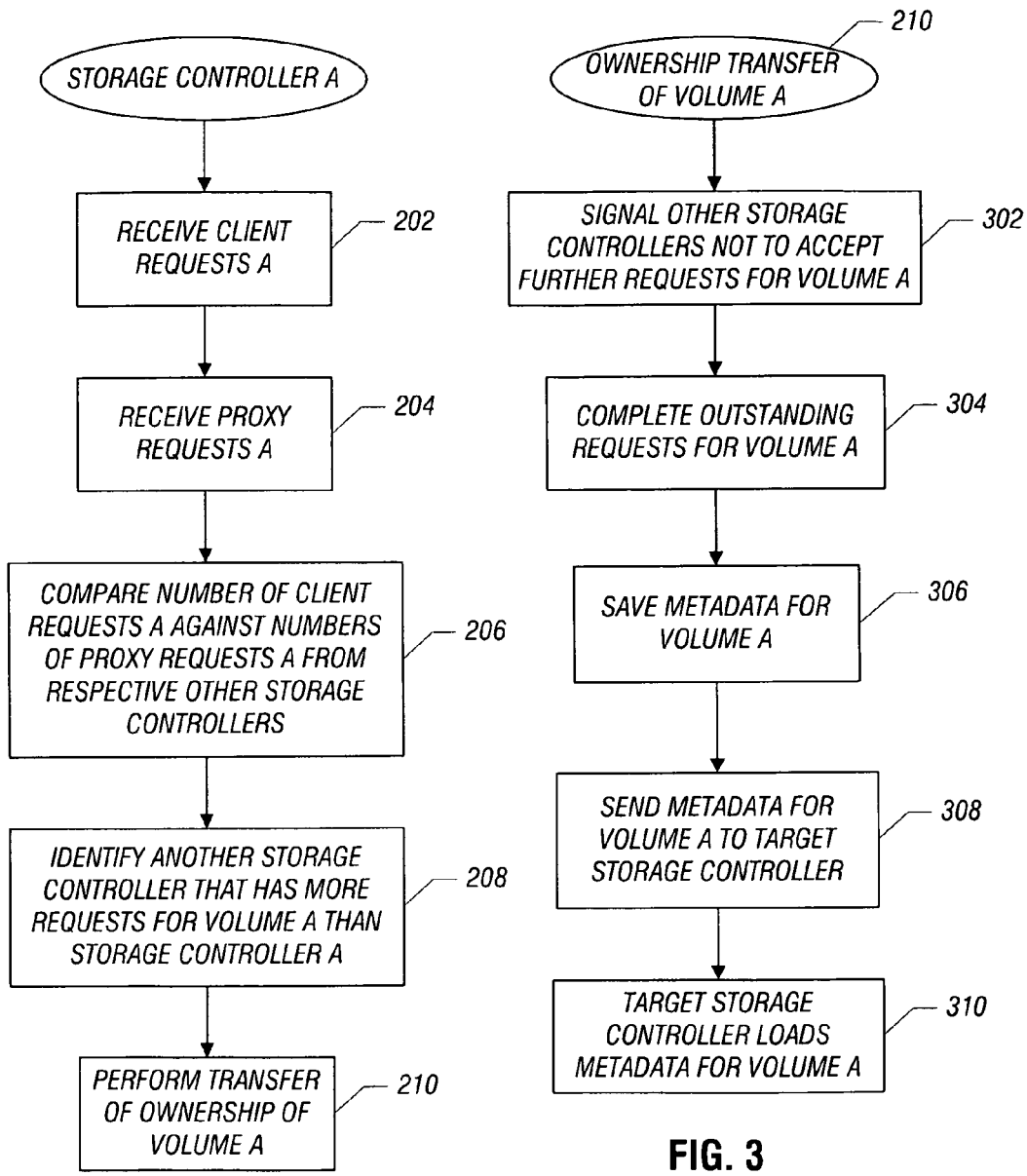

TRANSFER CONTROL OF A STORAGE VOLUME BETWEEN STORAGE CONTROLLERS IN A CLUSTER

BACKGROUND

In some storage arrangements, clusters of storage controllers can be provided to improve performance, provide redundancy, and provide load balancing. Requests received from client computers are processed by the storage controllers. The storage controllers send access commands to respective storage subsystems to perform actions (e.g., reads, writes, deletes, etc.) specified by the requests from the client computers.

Storage volumes, which are logical units of data, can be defined in the storage subsystems that are controlled by the storage controllers. Under certain conditions, such as in the presence of failures or other faults, performance of the cluster of storage controllers may be degraded.

BRIEF DESCRIPTION OF THE DRAWINGS

Some embodiments of the invention are described with respect to the following figures:

FIG. 2 is a flow diagram of a process of determining whether transfer of ownership of a storage volume between storage controllers in a cluster should be performed, in accordance with an embodiment;

FIG. 3 is a flow diagram of a process of transferring ownership of a storage volume between different storage controllers of a cluster, in accordance with an embodiment.

DETAILED DESCRIPTION

A storage arrangement can include a cluster of storage controllers that are coupled to storage subsystems that store storage volumes. A storage volume is a logical unit of data that can be defined across one or more storage devices of the storage subsystems. Client computers are able to submit requests to the cluster of storage controllers to access data in the storage volumes.

In a storage arrangement referred to as an asymmetric redundancy storage arrangement, one of the storage controllers in the cluster can be designated as an "optimal" storage controller (that has an optimal path) to a particular storage volume. Thus, different storage volumes can have different storage controllers designated as optimal storage controllers. An optimal storage controller that is assigned to control a given storage volume is also referred to as an "owner" of the given storage volume. Stated differently, a storage controller that is an owner of the given storage volume performs control of accesses made to the given storage volume (while other storage controllers do not control access to the given storage volume).

A storage controller is considered to have an optimal path to a particular storage volume if the storage controller is able to execute requests for the particular storage volume faster or more efficiently than other storage controllers. Under certain conditions, such as conditions in which failure or other fault has occurred, a client computer may not be able to send requests for the particular storage volume to the assigned optimal storage controller. In such scenarios, performance in accessing data of the particular storage volume may be degraded.

In accordance with some embodiments, an ownership control mechanism is provided to automatically transfer ownership of the particular storage volume between different storage controllers in the cluster if the ownership control mechanism detects that a different storage controller would be able to access the particular storage volume more optimally than the previous owner storage controller.

Figure 1:
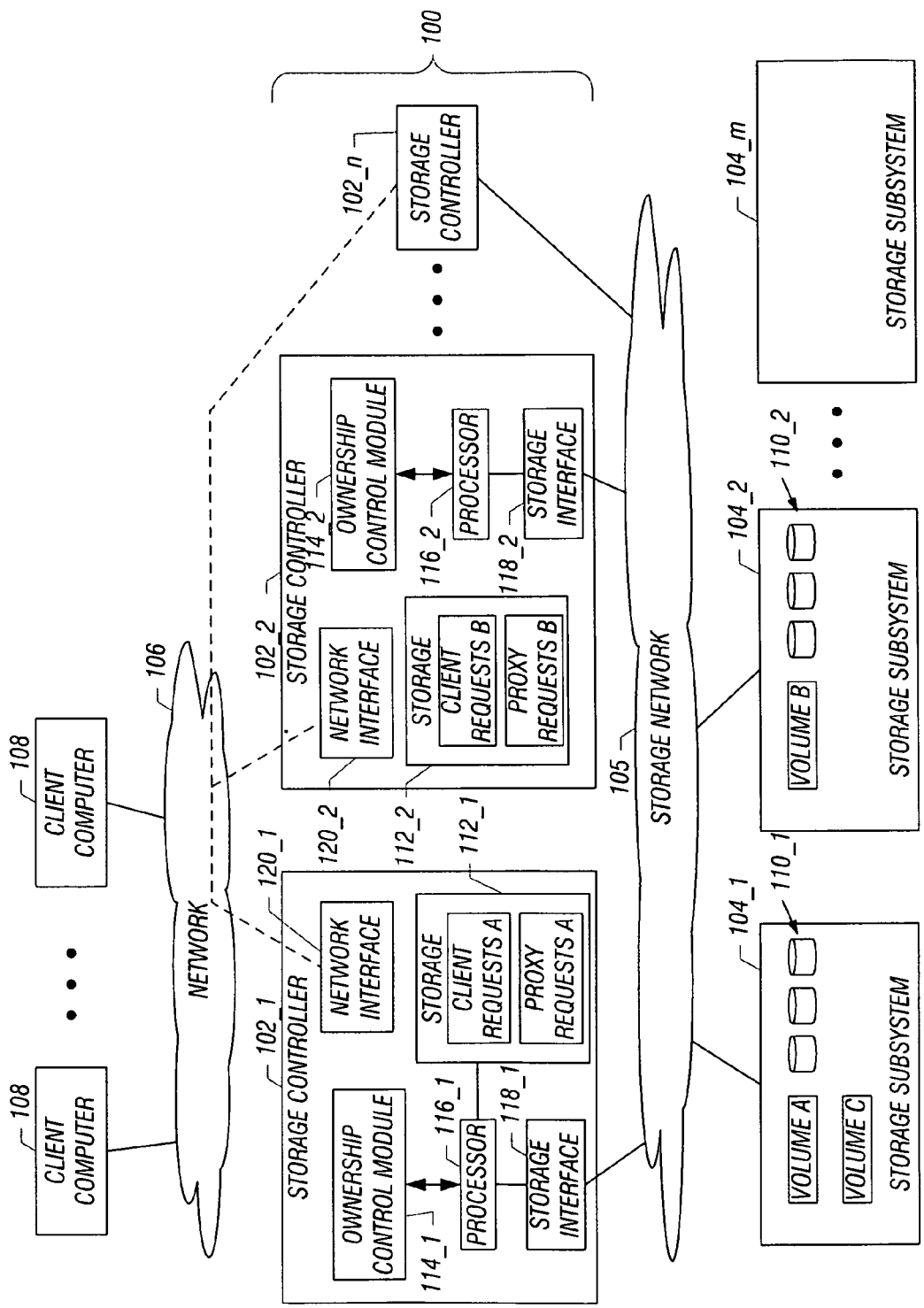
FIG. 1 is a schematic diagram of an exemplary storage arrangement in which some embodiments of the invention can be incorporated.

FIG. 1 illustrates a cluster 100 of storage controllers 102_1, 102_2, and 102_n (where n≧2). Providing multiple storage controllers in a cluster allows for provision of redundancy in case of failure of any of the storage controllers. Moreover, load balancing can be provided by using multiple storage controllers in a cluster. Client computers 108 are able to submit requests (read requests, write requests, delete requests, etc.) over a network 106 (e.g., local area network, Internet, etc.) to the storage controllers 102_1 to 102_n. The client computers 108 can be user computers (e.g., notebook computers, desktop computers, digital personal assistants, smart phones, etc.), or alternatively, the client computers 108 can be server computers that are accessible by user computers.

The storage controllers 102_1 to 102_n are in turn coupled over a storage network 105 (e.g., Fibre Channel network, SCSI (Small Computer System Interface) link, Serial Attached SCSI (SAS) link, etc.) to storage subsystems 104_1 to 104_m (where m≧2 and where m can be the same as or different from n). In response to requests from the client computers 108, the storage controllers 102_1 through 102_n are able to access the storage subsystems 104 to perform the requested actions.

As further depicted in FIG. 1, each storage subsystem 104 includes one or more storage volumes (or more simply "volumes"). A volume is a logical unit of data that can be defined on one or more storage devices, including an array of storage devices 110_1 in storage subsystem 104_1, storage devices 110_2 in storage subsystem 104_2, and so forth. As used here, the term "storage device" refers to a physical storage element, such as a disk-based storage element (e.g., hard disk drive, optical disk drive, etc.) or other type of storage element (e.g., semiconductor storage element). The multiple storage devices within a storage subsystem can be arranged as an array, in one exemplary implementation.

The storage subsystem 104_1 stores volumes A and C, while the storage subsystem 104_2 stores volume B. In a different implementation, it is possible that a volume can be defined across storage devices in more than one storage subsystem.

In accordance with some embodiments, the cluster 100 of storage controllers has an asymmetric, redundant arrangement of storage controllers. Each storage controller is assigned to be an "owner" of a corresponding volume. For example, storage controller 102_1 can be assigned to be the owner of volume A, while the storage controller 102_2 can be assigned to be the owner of volume B. The owner of volume C can be any one of the storage controllers 102_1 to 102_n. A storage controller can be the owner of multiple storage volumes in one or multiple storage subsystems.

A storage controller is considered to be the owner of a particular volume if requests for accessing the particular volume are routed through the storage controller. For example, the storage controller can receive a request for the particular volume directly from a client computer 108 over the network 106. Such a request is referred to as a "client request." Alternatively, the storage controller can receive a request of a client computer from another storage controller, where this other storage controller received the request directly from a client computer. Such a request received from another storage controller is referred to as a "proxy request."

As noted above, the storage controller that is assigned to be the owner of a particular volume is considered to be the optimal storage controller that is coupled over an optimal path to the particular volume. Factors that affect how fast or efficiently a storage controller is able to access a corresponding volume can include the configuration of the network arrangement between the storage controller and the particular volume. For example, the different storage controllers 102_1 to 102_n can be coupled through different sets of network components contained in the storage network 105 to corresponding different storage subsystems. The storage network 105 can include expanders, concentrators, routers, and other communications devices. One storage controller 102_1 can be coupled over a first set of network components to one storage subsystem, while another storage controller can be coupled by a different set of network components to another storage subsystem. Loading of a particular storage controller can also affect the speed and efficiency with which the storage controller is able to access particular volumes.

In certain situations, a change (e.g., a hardware failure, a software fault, etc.) in the client computers 108 and/or storage controllers can change which storage controller requests for a particular volume are sent. For example, even though the storage controller 102_1 is the owner of volume A, a changing condition can cause client computers to send requests for volume A to storage controller 102_2 instead of directly to storage controller 102_1. In this scenario, the storage controller 102_2 will detect that storage controller 102_1 is the owner of volume A, and will forward requests (proxy requests) for volume A to the storage controller 102_1. However, having to route a large number of requests through one storage controller to another storage controller is inefficient.

In accordance with some embodiments, an ownership control mechanism is provided to allow for ownership of a particular volume to be transferred between storage controllers in response to monitoring of requests for the particular volume by the storage controller that owns the particular volume. Thus, for example, the storage controller 102_1 can monitor requests for volume A. The requests for volume A can include client requests (requests that are received directly from client computers for volume A) and proxy requests (requests received from other storage controllers for volume A). For example, storage controller 102_2 or storage controller 102_n may have received client requests for volume A from client computers. In response to such requests, the storage controller 102_2 or 102_n forwards or proxies the requests to storage controller 102_1, which is the owner of volume A.

The storage controller 102_1 includes storage media 112_1 (e.g., one or more of semiconductor memory, disk-based storage device, etc.) for storing information, including client requests A (which are client requests for volume A) and proxy requests A (which are proxy requests for volume A). The client requests A and proxy requests A can be collected in the storage media 112_1 to allow the storage controller 102_1 (and more specifically an ownership control module 114_1) to compare the number of client requests A to the number of proxy requests A. Based on this comparison, the ownership control module 114_1 may detect that another storage controller may be the more efficient (optimal) storage controller for volume A. This may be because there are a larger number of proxy requests for volume A from another storage controller (e.g., storage controller 102_2) than there are client requests for volume A received by the storage controller 102_1. When such condition is detected, ownership of volume A is transferred from storage controller 102_1 to the other storage controller 102_2 by the ownership control module 114_1.

The ownership control module 114_1 can be a software module executable on a processor 116_1. The processor 116_1 is connected to a storage interface 118_1 to allow the storage controller 102_1 to communicate over the storage network 105.

The storage controller 102_1 also includes a network interface 120_1 to allow the storage controller 102_1 to communicate over the network 106 with client computers 108 and with other storage controllers in the cluster 100. In an alternative embodiment, instead of communicating over the network 106, storage controllers can communicate with each other over the storage network 105, or through another network.

The storage controller 102_2 contains similar components as the storage controller 102_1, including an ownership control module 114_2, a processor 116_2, a storage interface 118_2, storage media 112_2, and a network interface 120_2. Assuming that the storage controller 102_2 is the owner of volume B, the storage media 112_2 is used to store client requests B (requests received from client computers for volume B) and proxy requests B (requests for volume B received from other storage controllers for volume B). The ownership controller module 114_2 in the storage controller 102_2 can similarly monitor the client request B and proxy request B to determine whether or not ownership of volume B should be transferred to another storage controller.

The storage controller 102_n contains components that are similar to components of storage controllers 102_1 and 102_2.

The transfer of ownership of volumes according to some embodiments is performed in an automated manner without intervention of a host device such as a client computer 108 or another device. As a result, the client computer 108 or other requesting device does not have to control the changing of owners of the volumes. By using the storage controllers to determine which storage controller should be the owner of any given volume, enhanced performance is provided to the client computers for access of data in the volumes deployed in the storage subsystems.

The volumes stored in the storage subsystems can be RAID (redundancy array of inexpensive disks) volumes. A RAID volume is deployed across multiple storage devices to provide redundancy. The redundancy can be based on mirroring of data, where data in one storage device is copied to a mirror storage device (which contains a mirror copy of the data). RAID-1 is an example of a mirroring redundancy scheme. In this arrangement, if an error causes data of the source storage device to be unavailable, then the mirror storage device can be accessed to retrieve the data.

Another type of redundancy is parity-based redundancy, where data is stored across a group of storage devices, and parity information associated with the data is stored in another storage device. If data within any storage device in the group of storage devices were to become inaccessible (due to data error or storage device fault or failure), the parity information can be accessed to reconstruct the data. Examples of parity-based redundancy schemes include RAID-5 and RAID-6 schemes.

If used with RAID volumes, the storage controllers in the cluster 100 are RAID controllers. Although reference is made to RAID volumes, note that other types of volumes can be employed in other embodiments.

FIG. 2 is a flow diagram of a process performed by storage controller A (the current owner of volume A), in accordance with an embodiment. Storage controller A receives (at 202) client requests A, and receives (at 204) proxy requests A.

In response to some trigger (such as after a predefined time interval, in response to user request, in response to a loading condition exceeding a threshold, in response to detecting that a performance metric has dropped below a threshold, or in response to another event), storage controller A compares (at 206) the number of client requests A against numbers of proxy requests A from respective other storage controllers. Next, storage controller A identifies (at 208) another storage controller that has more requests for volume A than storage controller A. In other words, the number of proxy requests A from this other storage controller (referred to as the "target" storage controller) exceeds the number of client requests for volume A at storage controller A. In response to such identification of such target storage controller, transfer of ownership of volume A is performed (at 210) to transfer ownership of volume A from storage controller A to the target storage controller.

The transfer of ownership of volume A is depicted in FIG. 3. The storage controller A signals (at 302) other storage controllers not to accept further requests for volume A. Storage controller A likewise does not accept requests for volume A. Thus, any request for volume A received by any of the storage controllers will be refused, and a "busy" or "not ready" indication can be returned to the requester. Next, storage controller A completes (at 304) any outstanding requests for volume A. Likewise, the other storage controllers also complete their outstanding requests for volume A, and can provide indications of such completions to storage controller A.

Storage controller A then saves (at 306) the metadata for volume A. The metadata for volume A can also be referred to as "state information." The metadata for volume A can include one or more of the following: information regarding which storage device(s) of the volume was previously marked as failed; information relating to which storage device(s) of the volume has been replaced; information relating to the status of redundancy for the volume (e.g., status of building of RAID-5 or RAID-6 parity information, status of mirroring of data for RAID-1 redundancy); and so forth.

The storage controller then sends (at 308) the metadata for volume A to the target storage controller. The target storage controller loads the metadata for volume A (at 310), at which point the target storage controller becomes the owner of volume A. Also, at this point, the target storage controller can accept new requests for volume A.

Figure 4:
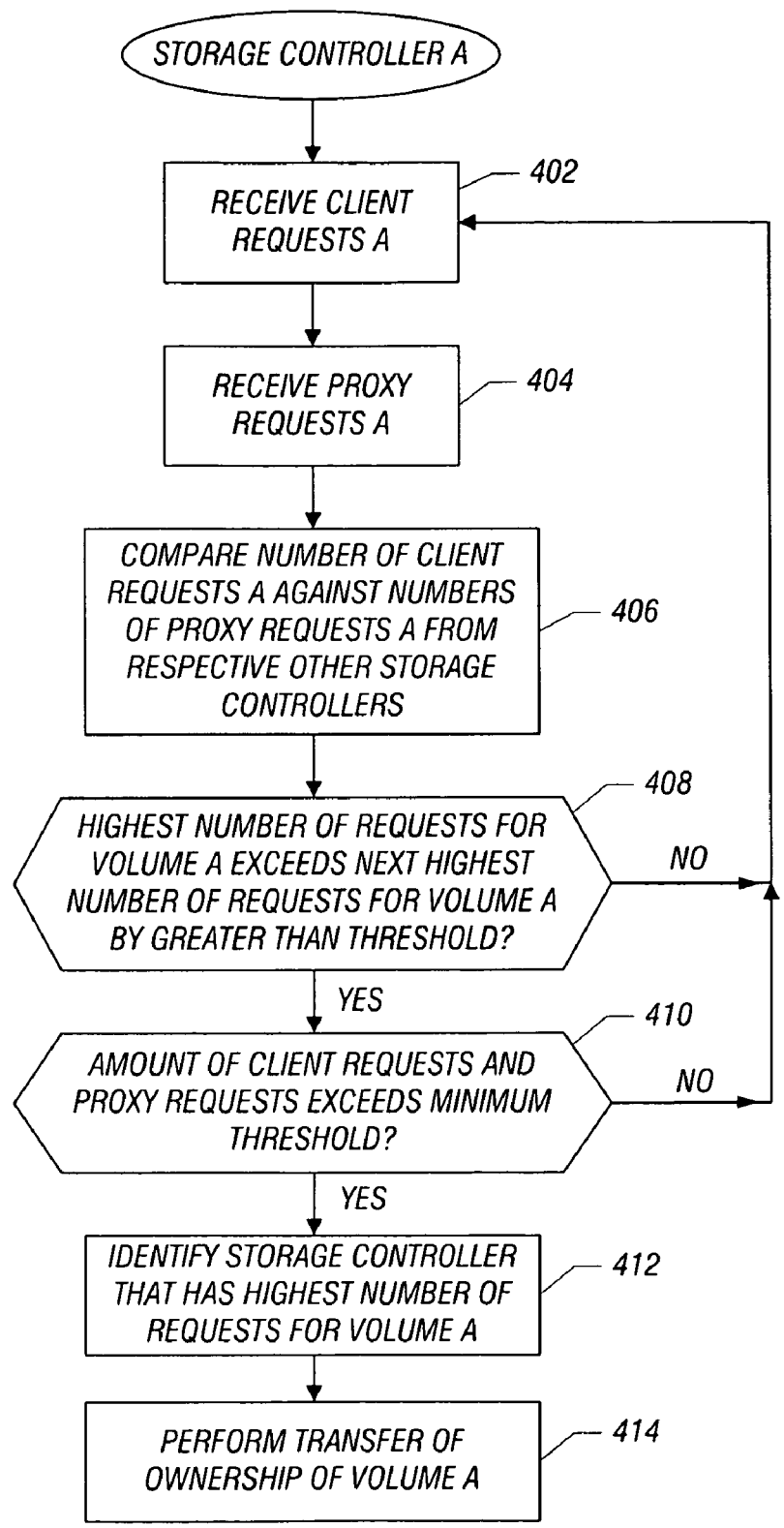
FIG. 4 is a flow diagram of a process of determining whether transfer of ownership of a storage volume between storage controllers in a cluster should be performed, in accordance with another embodiment.

FIG. 4 shows an alternative embodiment of a process for determining whether transfer of ownership of volume A is to be performed. The process of FIG. 4 prevents ownership changes from occurring too frequently by introducing hysteresis into the process.

Storage controller A receives (at 402) client requests A, and receives (at 404) proxy requests A. Next, storage controller A compares (at 406) the number of client requests A against numbers of proxy requests A from respective other storage controllers. Then, the storage controller A determines (at 408) if the highest number of requests for volume A exceeds the next highest number of requests for volume A by greater than a predefined threshold. For example, storage controller 102_1 may be the current owner of volume A. During a predefined time interval, storage controller 102_2 may have submitted a first number of proxy requests for volume A to storage controller 102_1, while storage controller 102_n may have submitted a second number of proxy requests for volume A to the storage controller 102_1 (where the first number is greater than the second number). It is assumed that the first number of proxy requests and second number of proxy requests both exceed the number of client requests for volume A at the storage controller 102_1.

Since the storage controller 102_2 has the highest number of requests for volume A (greater than the number of requests received by storage controller 102_1 or storage controller 102_n), the storage controller 102_2 should be assigned to become the owner of volume A. However, before that occurs, the process of FIG. 4 determines whether the first number of proxy requests for volume A from storage controller 102_2 exceeds the second highest number of requests for volume A (in this case proxy requests from storage controller 102_n) by greater than the predefined threshold. If not, transfer of ownership of volume A is not performed, and the process returns to task 402. Note that in an alternative implementation, the second highest number of requests can be client requests received by the storage controller 102_1.

However, if the condition at 408 is true, then storage controller A next determines (at 410) if the total number of client requests and storage requests for volume A exceeds some minimum threshold. This is performed to ensure that transfer of ownership is performed only when there is heavy loading for volume A in the cluster 100 of storage controllers.

If the condition of 410 is not true, then ownership transfer is not performed and the process returns to task 402. However, if the condition of 410 is true, then the storage controller that has the highest number of requests for volume A is identified (at 412). In the example above, this storage controller is storage controller 102_2.

Next, transfer of ownership of volume A is performed (at 414) to transfer ownership to this identified storage controller.

Instructions of software described above (including the ownership control modules 114_1 and 114_2 of FIG. 1) are loaded for execution on a processor (such as processors 116_1 and 116_2 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A first storage controller for use as part of a cluster of storage controllers, comprising:
   an interface to communicate with at least one storage subsystem having a storage volume, wherein the first storage controller is to be initially assigned to process requests for the storage volume; and
   a processor to:
      receive requests to access the storage volume, wherein the requests include client requests from one or more client computers and proxy requests from one or more other storage controllers in the cluster;
      based on comparing a number of the client requests to a number of the proxy requests from a second of the storage controllers in the cluster, determining that the second storage controller is to be assigned to process requests for the storage volume; and
      in response to the comparing, transfer control of the storage volume from the first storage controller to the second storage controller.

2. The first storage controller of claim 1, wherein the received requests include proxy requests to access the storage volume from plural other storage controllers in the cluster, wherein the processor is to further compare the number of client requests for the storage volume to corresponding numbers of proxy requests from the plural other storage controllers,
   wherein determining that the second storage controller in the cluster is to be assigned to process requests for the storage volume is based on the comparing of the number of client requests to corresponding numbers of proxy requests from the plural other storage controllers.

3. The first storage controller of claim 2, wherein the processor is to further determine that the second storage controller in the cluster has a highest number of requests for the storage volume.

4. The first storage controller of claim 1, wherein the processor is to further:
   send metadata of the storage volume to the second storage controller to perform the transfer of control of the storage volume to the second storage controller.

5. The first storage controller of claim 4, wherein the processor is to further:
   signal other storage controllers not to accept further requests for the storage volume prior to performing the transfer of control of the storage volume.

6. The first storage controller of claim 1, wherein the processor is to further determine if a condition is true before performing transfer of control of the storage volume from the first storage controller to the second storage controller.

7. The first storage controller of claim 6, wherein the condition includes a determination of whether a highest number of requests for the storage volume from the second storage controller exceeds a next highest number of requests for the storage volume from another storage controller by greater than a predefined threshold.

8. The first storage controller of claim 6, wherein the condition includes a determination of whether a total number of client requests and proxy requests for the storage volume exceeds a minimum threshold.

9. The first storage controller of claim 1, wherein the processor is to provide access of the storage volume that is a RAID (redundancy array of inexpensive disks) volume.

10. The first storage controller of claim 1, wherein the client requests for the storage volume are received directly from the one or more client computers, and wherein the proxy requests are requests from the one or more client computers for the storage volume forwarded by the one or more other storage controllers to the first storage controller.

11. The first storage controller of claim 1, wherein determining that the second storage controller is to be assigned to process requests for the storage volume is in response to determining that the number of the proxy requests from the second storage controller exceeds the number of the client requests received by the first storage controller.

12. A method for use with a cluster of storage controllers that are able to access at least one storage subsystem having a storage volume, comprising:
   receiving, by a first of the storage controllers that is currently an owner of the storage volume, client requests from one or more client computers and proxy requests from one or more other storage controllers in the cluster;
   based on numbers of the client requests and the proxy requests, determining that a transfer of ownership is to be performed from the first storage controller to a second storage controller in the cluster, wherein the determining comprises determining that the second storage controller has provided a higher number of proxy requests for the storage volume than the number of the client requests; and
   performing the transfer of ownership of the storage volume from the first storage controller to the second storage controller in response to the determining.

13. The method of claim 12, further comprising applying hysteresis in determining whether transfer of ownership of the storage volume is to be performed.

14. The method of claim 13, wherein applying the hysteresis comprises:
   checking whether a highest number of proxy requests for the storage volume exceeds a next highest number of requests for the storage volume by greater than a predefined threshold.

15. The method of claim 13, wherein applying the hysteresis comprises:
   checking whether a total number of client requests and proxy requests for the storage volume exceeds a predefined minimum threshold.

16. The method of claim 12, wherein performing the transfer of ownership comprises:
   the first storage controller signaling the one or more other storage controllers to not accept any further requests for the storage volume;
   the first storage controller completing any outstanding requests for the storage volume; and
   after completing any outstanding requests, the first storage controller sending metadata of the storage volume to the second storage controller.

17. An article comprising at least one computer-readable storage medium containing instructions that upon execution cause a first storage controller to:
   store information relating to client requests for a storage volume and relating to proxy requests for the storage volume, wherein the client requests are received from one or more client computers, and wherein the proxy requests are received from one or more other storage controllers;

determine, based on the stored information, whether a transfer of ownership of the storage volume is to be performed from the first storage controller to a second storage controller, wherein the determining includes comparing a number of the client requests to a number of the proxy requests from the second storage controller.

18. The article of claim 17, wherein the first storage controller comprises a RAID (Redundant Array of Inexpensive Disks) controller.

19. The article of claim 17, wherein the instructions upon execution cause the storage controller to further determine if a condition is true before determining that the transfer of ownership is to be performed, wherein the condition includes at least one of: a determination of whether a highest number of proxy requests for the storage volume from the second storage controller exceeds a next highest number of proxy requests for the storage volume from another storage controller by greater than a predefined threshold, or a determination of whether a total number of client requests and proxy requests for the storage volume exceeds a minimum threshold.

20. The article of claim 17, wherein the client requests for the storage volume are received directly from the one or more client computers, and wherein the proxy requests are requests from the one or more client computers for the storage volume forwarded by the one or more other storage controllers to the first storage controller.

21. The article of claim 17, wherein determining that the transfer of ownership of the storage volume is to be performed is in response to determining that the number of the proxy requests from the second storage controller exceeds the number of the client requests received by the first storage controller.

* * * * *